US012647841B2

(12) United States Patent
Hwang

(10) Patent No.: US 12,647,841 B2
(45) Date of Patent: Jun. 2, 2026

(54) METHOD AND APPARATUS FOR TRIGGERING FALLBACK USING RRC ESTABLISHMENT CAUSE IN COMMUNICATIONS SYSTEM

(71) Applicant: SK TELECOM CO., LTD., Seoul (KR)

(72) Inventor: Ui Tae Hwang, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 578 days.

(21) Appl. No.: 18/022,822

(22) PCT Filed: Jun. 30, 2021

(86) PCT No.: PCT/KR2021/008242
§ 371 (c)(1),
(2) Date: Feb. 23, 2023

(87) PCT Pub. No.: WO2022/092482
PCT Pub. Date: May 5, 2022

(65) Prior Publication Data
US 2023/0362743 A1     Nov. 9, 2023

(30) Foreign Application Priority Data

Oct. 27, 2020     (KR) ........................ 10-2020-0140494

(51) Int. Cl.
*H04W 36/00*          (2009.01)
*H04W 76/10*          (2018.01)
*H04W 36/14*          (2009.01)

(52) U.S. Cl.
CPC ....... *H04W 36/0022* (2013.01); *H04W 76/10* (2018.02); *H04W 36/1443* (2023.05)

(58) Field of Classification Search
CPC ............. H04W 36/0022; H04W 76/10; H04W 36/1443; H04W 36/00222; H04W 36/00226; H04W 76/19; H04W 88/08
See application file for complete search history.

(56) References Cited

U.S. PATENT DOCUMENTS

2009/0238143  A1     9/2009  Mukherjee et al.
2010/0182971  A1     7/2010  Chin
(Continued)

FOREIGN PATENT DOCUMENTS

CN          110418384          11/2019
CN          111586597          8/2020
WO     WO 2015-066383          5/2015

OTHER PUBLICATIONS

"Establishment Cause for Voice and Video", R2-1811044, 3GPP TSG-RAN2#103, Gothenburg, Sweden, Aug. 20-24, 2018 (Year: 2018).*
(Continued)

*Primary Examiner* — Moo Jeong
*Assistant Examiner* — David Zhijun Sun
(74) *Attorney, Agent, or Firm* — KED & ASSOCIATES, LLP

(57) ABSTRACT

A method and apparatus for triggering fallback using RRC establishment cause in a communications system is disclosed herein. An aspect of the present disclosure provides a base station of a first wireless communication system for triggering fallback from the first wireless communication system to a second wireless communication system, the base station including: a receiving unit configured to receive an RRC connection request message from user equipment and check whether or not the user equipment requests a call service using the RRC connection request message; and a fallback trigger unit configured to trigger the fallback to the
(Continued)

second wireless communication system when the user equipment requests the call service.

14 Claims, 8 Drawing Sheets

(56) References Cited

U.S. PATENT DOCUMENTS

| | | | |
|---|---|---|---|
| 2011/0028120 A1* | 2/2011 | Wu | H04L 65/1095 |
| | | | 455/404.1 |
| 2019/0159099 A1 | 5/2019 | Xu et al. | |
| 2019/0174003 A1* | 6/2019 | Chandramouli | H04W 48/20 |
| 2019/0394683 A1* | 12/2019 | Sillanpaa | H04W 36/0079 |
| 2020/0163151 A1 | 5/2020 | Nakarmi et al. | |
| 2020/0245195 A1 | 7/2020 | Zhu et al. | |
| 2021/0037430 A1 | 2/2021 | Jin et al. | |
| 2022/0086721 A1* | 3/2022 | Wu | H04W 36/00698 |

OTHER PUBLICATIONS

"EPS fallback Initial context Setup", S2-1902075, 3GPP SA WG2 Meeting #131, Santa Cruz—Tenerife, Spain, Feb. 25-Mar. 1, 2019 (Year: 2019).*
International Search Report dated Oct. 27, 2021 issued in Application No. PCT/KR2021/008242.
Qualcomm Incorporated. Establishment Cause for Voice and Video. R2-1811044, 3GPP TSG-RAN2 Meeting #103. Gothenburg, Sweden. Aug. 10, 2018.
Huawei et al. HO and redirection from NR to LTE due to EPS fallback. R2-1913741, 3GPP TSG-RAN2 Meeting #107bis. Chongqing, China. Oct. 4, 2019.
Nokia et al. EPS Fallback Initial Context Setup. S2-1902075, 3GPP TSG-SA WG2 Meeting #131. Santa Cruz-Tenerife, Spain. Feb. 19, 2019.
Qualcomm Incorporated. Remaining Issues in UE Radio Capability for IMS Voice. R2-1814226, 3GPP TSG-RAN WG2 Meeting #103bis. Chengdu, China. Sep. 28, 2018.
Chinese Office Action dated Apr. 22, 2025, issued in Application No. 202180065695.X.

* cited by examiner

*810*
Receiving unit

*820*
Determination unit

*830*
Fallback trigger unit

METHOD AND APPARATUS FOR TRIGGERING FALLBACK USING RRC ESTABLISHMENT CAUSE IN COMMUNICATIONS SYSTEM

CROSS-REFERENCE TO RELATED APPLICATION

This application is a U.S., National Stage Application under 35 U.S.C. §§ 371 of PCT Application No. PCT/KR2021/008242, filed Jun. 30, 2021, which claims priority to Patent Application No. 10-2020-0140494, filed on Oct. 27, 2020 in Korea, the entire contents of which are incorporated herein by reference.

TECHNICAL FIELD

The present disclosure relates to a method and apparatus for triggering fallback using RRC establishment cause in communications system.

BACKGROUND

The description of this part only provides the background information of the present disclosure without configuring the related art.

As schemes for providing a voice call service in a 5th generation standalone (5G SA) system, there are two major schemes including a voice over NR (VoNR) scheme for transmitting voice packets based on a new radio (NR) network, and an evolved packet system fallback (EPS Fallback) scheme for transmitting voice packets based on a long term evolution (LTE) network by changing a radio access technology (RAT) to LTE and changing a core to an evolved packet core (EPC).

In the case of the VoNR scheme, when user equipment moves out of NR coverage, the change of the RAT and the core is performed during a call. This change of the RAT and the core during the call causes a packet loss, an increase in delay, an increase in jitter, and the like for voice packets, thereby causing deterioration of the quality of a voice service. The deterioration of the quality of the voice service leads to negative user experience. Therefore, it is difficult to provide a VoNR-based voice call service without quality deterioration in a situation in which the NR coverage is insufficient, such as an early stage of 5G commercialization.

In order to prevent such connection change during the call, the EPS fallback scheme performs the change of the RAT and the core when a standalone user equipment (SA UE) originates or receives a voice call. The EPS fallback scheme is a scheme suitable for use until the NR coverage is extended to a nationwide network and the quality of VoNR is stabilized because the EPS fallback scheme provides quality equivalent to that of existing voice over LTE (VoLTE) after the RAT and the core are changed.

However, the EPS fallback scheme has a problem in that a voice call setup time taken to connect the voice call is longer than that in VoNR. This increase in voice call setup time is caused by an EPS fallback trigger procedure, an RAT and core change procedure, a tracking area update (TAU) procedure, and a bearer setup procedure that are added when the EPS fallback scheme is used. Therefore, a solution for shortening the voice call setup time is required in the EPS fallback scheme.

DISCLOSURE

Technical Problem

A main object of the present disclosure is to provide a method and apparatus for triggering fallback using an RRC establishment cause in a communication system, for triggering EPS fallback by detecting a voice call and/or video call service request using an RRC establishment cause.

Technical Solution

An aspect of the present disclosure provides a base station of a first wireless communication system for triggering fallback from the first wireless communication system to a second wireless communication system, the base station including: a receiving unit configured to receive an RRC connection request message from user equipment and check whether or not the user equipment requests a call service using the RRC connection request message; and a fallback trigger unit configured to trigger the fallback to the second wireless communication system when the user equipment requests the call service.

Another aspect of the present disclosure provides a method of triggering fallback to a second wireless communication system by a base station of a first wireless communication system, the method comprising: receiving an RRC connection request message from a user equipment; checking whether or not the user equipment requests a call service using the RRC connection request message; and triggering the fallback to the second wireless communication system when the user equipment requests the call service.

Advantageous Effects

As described above, according to an embodiment of the present disclosure, the base station can determine whether or not the EPS fallback is to be triggered, by detecting a call service request using the RRC establishment cause. Accordingly, it is possible to make an EPS fallback trigger time earlier, as compared with an EPS fallback trigger scheme of the related art, and shorten an initial setup time.

BRIEF DESCRIPTION OF THE DRAWINGS

FIG. 5 is a flowchart illustrating a call setup process using EPS fallback according to a second embodiment of the present disclosure.

FIG. 6 is a flowchart illustrating a call setup process using EPS fallback according to a third embodiment of the present disclosure.

FIG. 7 is a flowchart illustrating a call setup process using EPS fallback according to a fourth embodiment of the present disclosure.

REFERENCE NUMERALS

Figure 1:
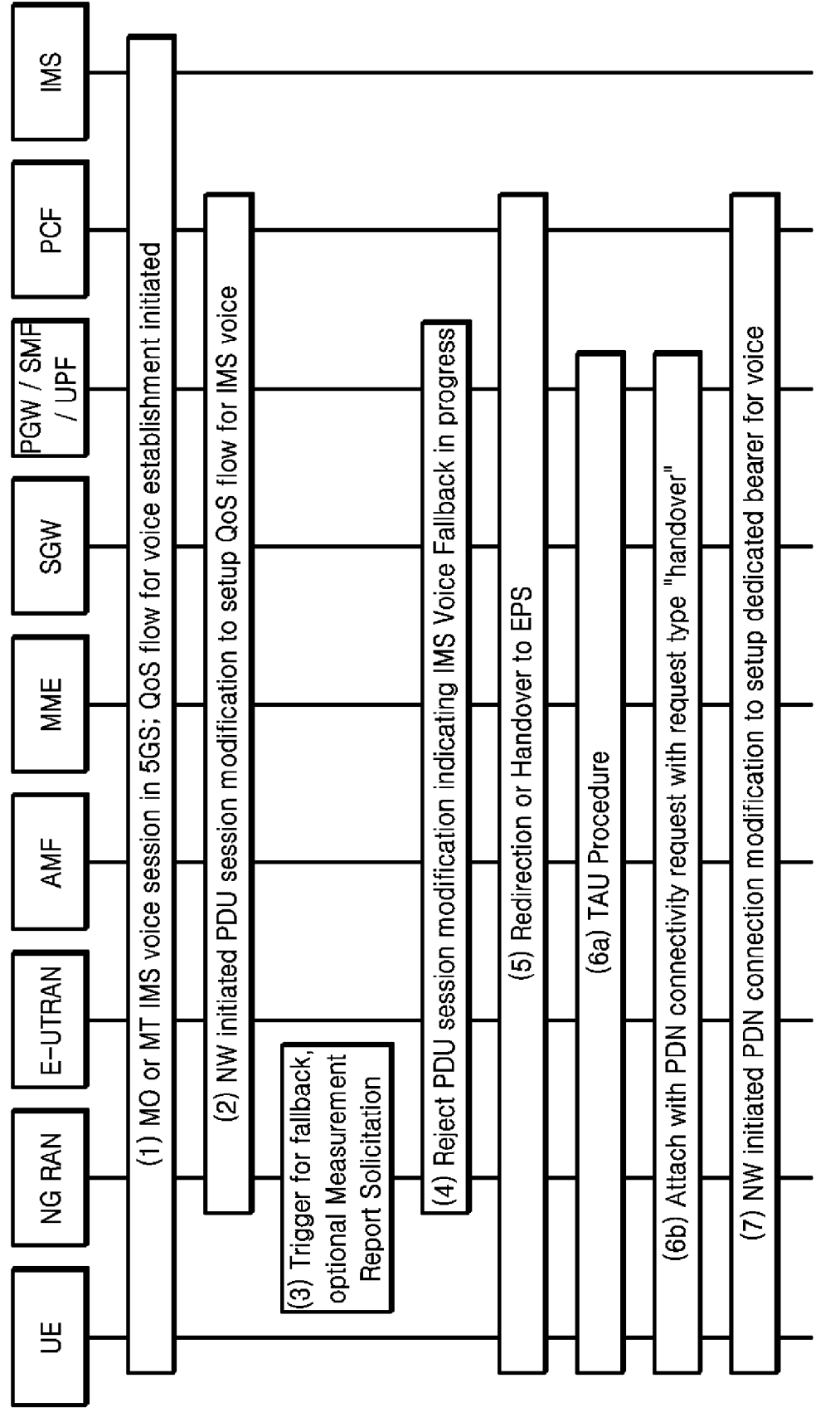
FIG. 1 is a flowchart illustrating an EPS fallback process.

800: base station 810: reception unit
820: determination unit 830: fallback trigger unit

DETAILED DESCRIPTION

Hereinafter, some exemplary embodiments of the present disclosure will be described in detail with reference to the accompanying drawings. In the following description, like reference numerals preferably designate like elements, although the elements are shown in different drawings. Furthermore, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

In the present disclosure, a fallback technology for moving user equipment from a first wireless communication system to a second wireless communication system when a call service request is made will be described. In various embodiments of the present disclosure, an example of the first wireless communication system is a 5th Generation New Radio (5G NR) communication system, and an example of the second wireless communication system is a long term evolution (LTE) communication system. However, this is for convenience of description, and the present disclosure can be extended to systems other than the LTE communication system and/or the 5G NR communication system.

Hereinafter, the present disclosure may be described with reference to 3GPP TS 23.502, which is a technical specification regarding 5G, but this is for convenience of description and does not limit various embodiments of the present disclosure.

FIG. 1 is a flowchart illustrating an EPS fallback process.

In (1) of FIG. 1, user equipment camps on a next generation radio access network (NG-RAN) of a 5th generation system (5GS), and IP multimedia system voice session establishment (IMS voice session establishment) is initiated.

In (2) of FIG. 1, in order to set up a quality of service flow (QoS flow) for a voice service, an NW initiated PDU session modification procedure is initiated. Specifically, an IMS server transmits a PDU session resource modify request message including content for setting a 5G QoS indicator (5QI) to 1 to the NG-RAN. In this case, the PDU session resource modify request may be transmitted to the NG-RAN through a policy control function (PCF), a session management function (SMF), and an access and mobility function (AMF).

In (3) of FIG. 1, the NG-RAN triggers evolved packet system fallback (EPS fallback).

In (4) of FIG. 1, the NG-RAN transmits a PDU session resource modify response message indicating that PDU session modification has been rejected due to the EPS fallback to the SMF via the AMF.

In (5) of FIG. 1, the NG-RAN initiates handover or redirection from 5GS to EPS. The NG-RAN transmits to the user equipment an NR RRC release message including LTE frequency information for connection of the user equipment.

In (6a) of FIG. 1, the user equipment changes a radio access technology (RAT) to LTE and initiates a tracking area update (TAU) procedure.

In (7) of FIG. 1, the NW initiated PDN connection modification procedure is initiated to set up a dedicated bearer for a voice service in LTE.

Hereinafter, based on the EPS fallback process in FIG. 1, a process in which the user equipment in an RRC idle state connects to a 5G base station (an NG-RAN node or gnb) to request a call service and a process in which the 5G base station performs the EPS fallback will be described.

Figure 2:
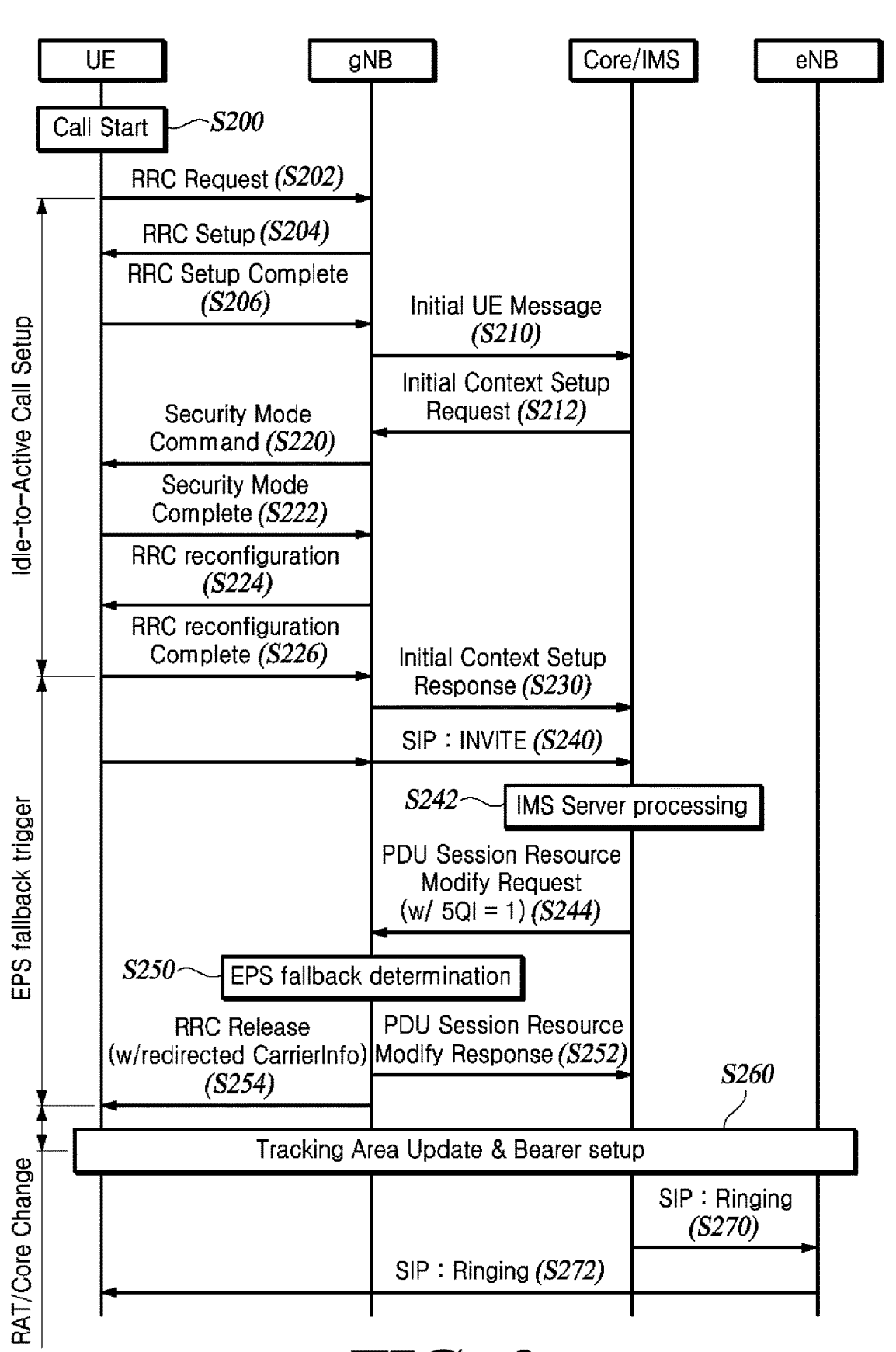
FIG. 2 is a flowchart illustrating a call setup process using EPS fallback.

FIG. 2 is a flowchart illustrating a voice call setup process using the EPS fallback.

When the user equipment in the RRC idle state originates a call (S200), the user equipment transmits an RRC connection request message to the 5G base station (S202), and the 5G base station transmits an RRC connection setup message to the user equipment in response to the RRC connection request (S204). After the user equipment receives the RRC connection setup message, the user equipment transitions from the RRC idle state to an RRC connected state.

The user equipment transmits an RRC connection setup complete message to the 5G base station (S206).

The 5G base station configures an initial UE message based on information included in the RRC connection setup message and transmits the initial UE message to a core network (S210). The core network transmits an initial context setup request message to the 5G base station (S212).

The 5G base station transmits an RRC security mode command message to the user equipment (S220), and the user equipment transmits an RRC security mode complete message to the 5G base station in response to the RRC security mode command (S222).

The 5G base station transmits an RRC connection reconfiguration message to the user equipment (S224), and the user equipment transmits an RRC connection reconfiguration complete message to the 5G base station in response to the RRC connection reconfiguration message (S226).

The 5G base station transmits an initial context setup complete message to the core network (S230).

The user equipment transmits an SIP INVITE message to the IMS server via the 5G base station (S240). The IMS server initiates an IMS voice session (S242) and transmits the PDU session resource modify request including content for setting 5QI to 1 to the 5G base station (S244). Here, the PDU session resource modify request may be transmitted to the 5G base station through PCF, SMF and AMF.

The 5G base station determines whether or not the EPS fallback is to be triggered based on the received PDU session resource modify request (S250), and transmits a PDU session resource modify response to the core network (or IMS) (S252).

When the 5G base station determines that the EPS fallback is to be triggered, the 5G base station transmits to the user equipment an RRC release message including LTE frequency information for fallback (S254).

The user equipment that has received the RRC release message changes the RAT to the LTE, and performs tracking area update (TAU) and bearer setup (S260).

The core network (or the IMS server) transmits a SIP ringing message indicating that called user equipment is in a state in which the user equipment can receive a call, to the user equipment via an LTE base station (E-UTRAN node or enb) (S270 and S272).

As described above, in the EPS fallback scheme illustrated in FIGS. 1 and 2, since the 5G base station can determine whether or not the EPS fallback is to be triggered only after the 5G base station receives the PDU session resource modify request from the core network (or the IMS server), there is a problem in that the voice call setup time taken to connect the voice call is longer than that in a voice over NR (VoNR) scheme.

In order to solve this problem, the present disclosure proposes a solution for reducing a voice call setup time as compared to the related art by detecting a call service request using an RRC establishment cause included in an RRC connection request and triggering EPS fallback.

Figure 3:
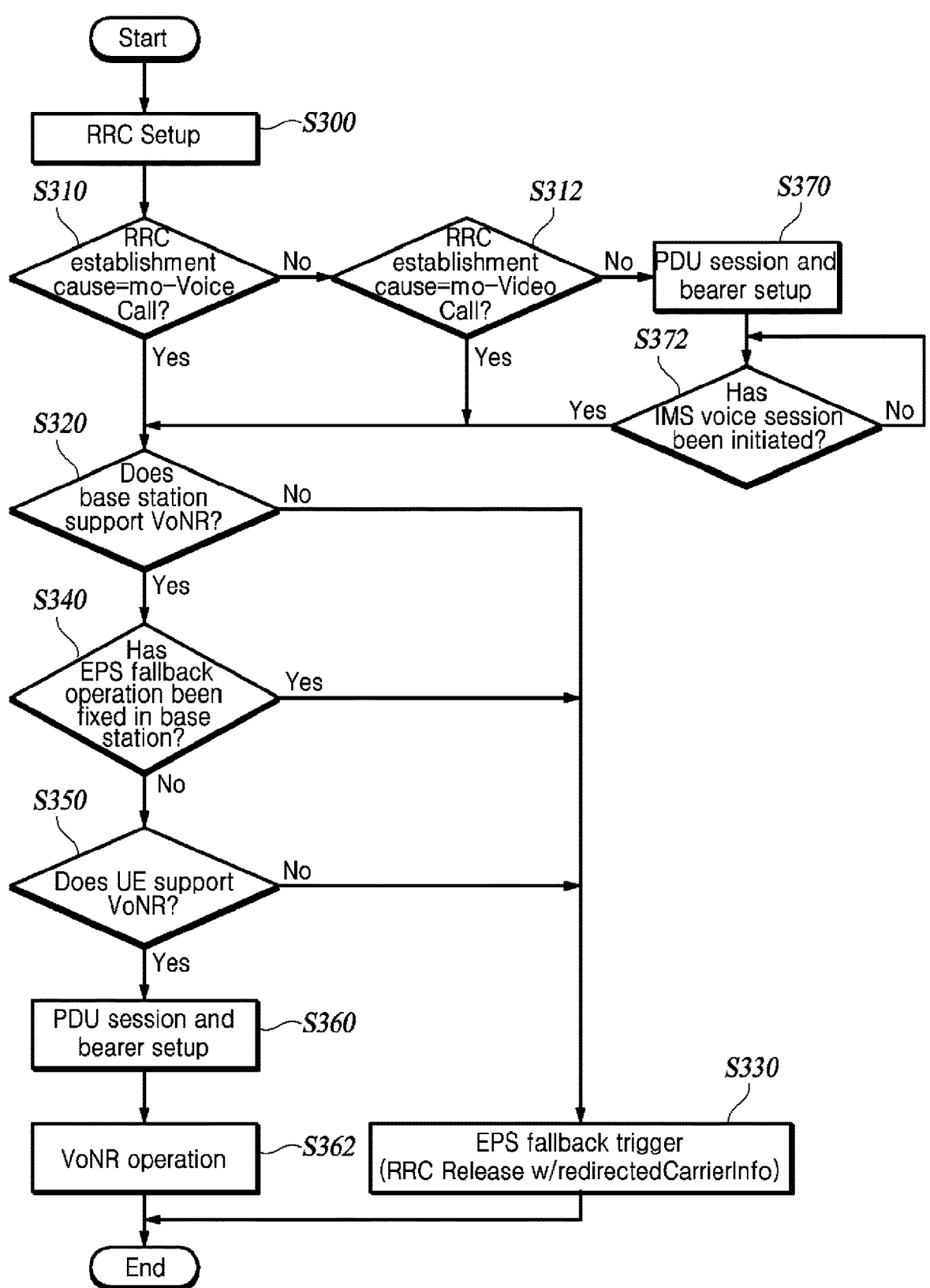
FIG. 3 is a flowchart illustrating a process in which a base station detects a call service request of user equipment and triggers EPS fallback according to an embodiment of the present disclosure.

FIG. 3 is a flowchart illustrating a process in which the base station detects the call service request of user equipment and triggers the EPS fallback according to the embodiment of the present disclosure.

When the user equipment in an idle state originates or receives a call, the 5G base station performs an RRC setup procedure for an RRC connection to the user equipment in the idle state (S300). In this case, the user equipment provides information indicating the RRC establishment cause to the 5G base station. For example, in the case of a connection for a voice call, the user equipment sets 'mo-VoiceCall' in an RRC establishment cause field in the RRC connection request message and transmits the RRC connection request message to the base station. Meanwhile, in the case of a connection for a video call, the user equipment sets 'mo-VideoCall' in the RRC establishment cause field in the RRC connection request message and transmits the resultant RRC connection request message to the base station.

The base station checks whether the RRC establishment cause included in the RRC connection request message is 'mo-VoiceCall' or 'mo-VideoCall' (S310 and S312).

When the RRC establishment cause is 'mo-VoiceCall' or 'mo-VideoCall', the base station checks whether the base station supports VoNR (S320). To this end, a first parameter indicating whether or not VoNR is supported may be defined in the base station in advance.

When the base station does not support VoNR, the base station immediately triggers the EPS fallback (S330). In this case, the base station triggers the EPS fallback by setting LTE frequency information for connection of the user equipment in the field 'redirectedCarrierlnfo' in the RRC release message and transmitting the RRC release message to the user equipment.

When the base station supports VoNR, the base station checks whether or not the base station is set to provide a call service only in the EPS fallback scheme (S340). To this end, a second parameter indicating a call service providing scheme may be defined in the base station in advance.

When the base station is set to provide a call service only in the EPS fallback scheme, the base station immediately triggers the EPS fallback (S330).

When the base station is not set to provide a call service only in the EPS fallback scheme, the base station checks whether the user equipment supports VoNR (S350). According to an embodiment of the present disclosure, the base station can check whether or not the user equipment supports VoNR by checking UE radio capability information in the initial context setup request message received from the AMF. For example, when an item 'voiceOverNR' in the UE radio capability information is set to 'supported', the base station can check that the user equipment supports VoNR. Meanwhile, according to another embodiment of the present disclosure, when the UE radio capability is not included in the initial context setup request message, the base station transmits a UE capability enquiry message instructing the user equipment to report the UE radio capability information. Accordingly, the base station may receive the UE radio capability information from the user equipment and check whether or not the item 'voiceOverNR' in the UE radio capability information is set to 'supported'.

When the user equipment does not support VoNR, the base station immediately triggers the EPS fallback (S330). When the user equipment supports VoNR, a PDU session and bearer setup procedure is initiated, and then the base station provides a VoNR-based call service to the user equipment (S362).

When the RRC establishment cause is not 'mo-VoiceCall' or 'mo-VideoCall', the PDU session and bearer setup procedure is initiated, and then, the base station transfers an SIP INVITE transmitted by the user equipment to the IMS server (S370).

The base station checks whether the IMS voice session has been initiated (S372). The base station may determine that the IMS voice session has been initiated when the base station receives the PDU session resource modify request including the content for setting 5QI to 1 from the IMS server. That is, when the base station cannot confirm the call service request of the user equipment using the RRC connection request message, for example, when the user equipment does not support an RRC establishment cause related to a voice call and/or a video call or the user equipment in an RRC connection state requests a call service, the core network (or the IMS server) instructs the base station to trigger the EPS fallback.

Figure 4:
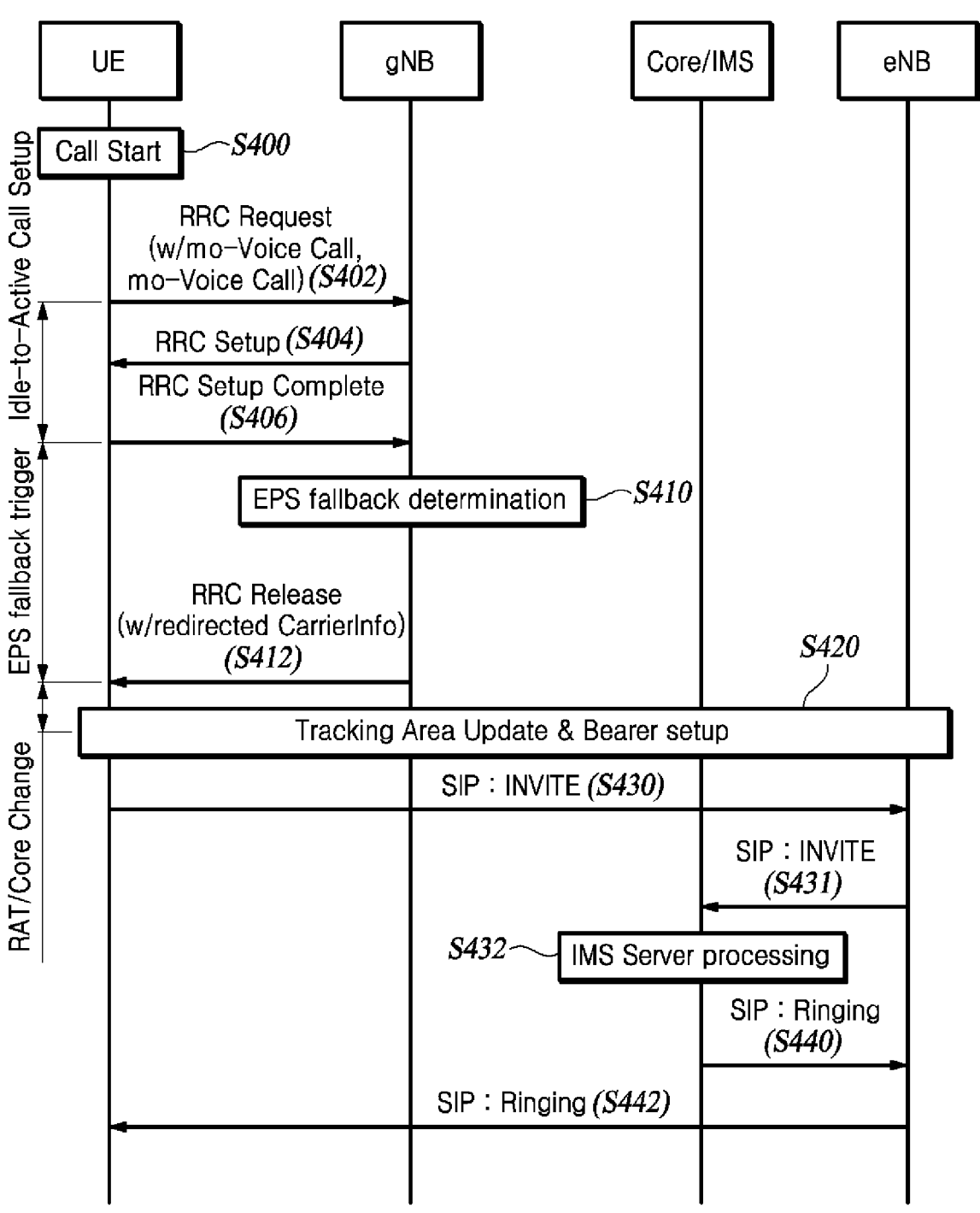
FIG. 4 is a flowchart illustrating a call setup process using EPS fallback according to a first embodiment of the present disclosure.
Figure 5:
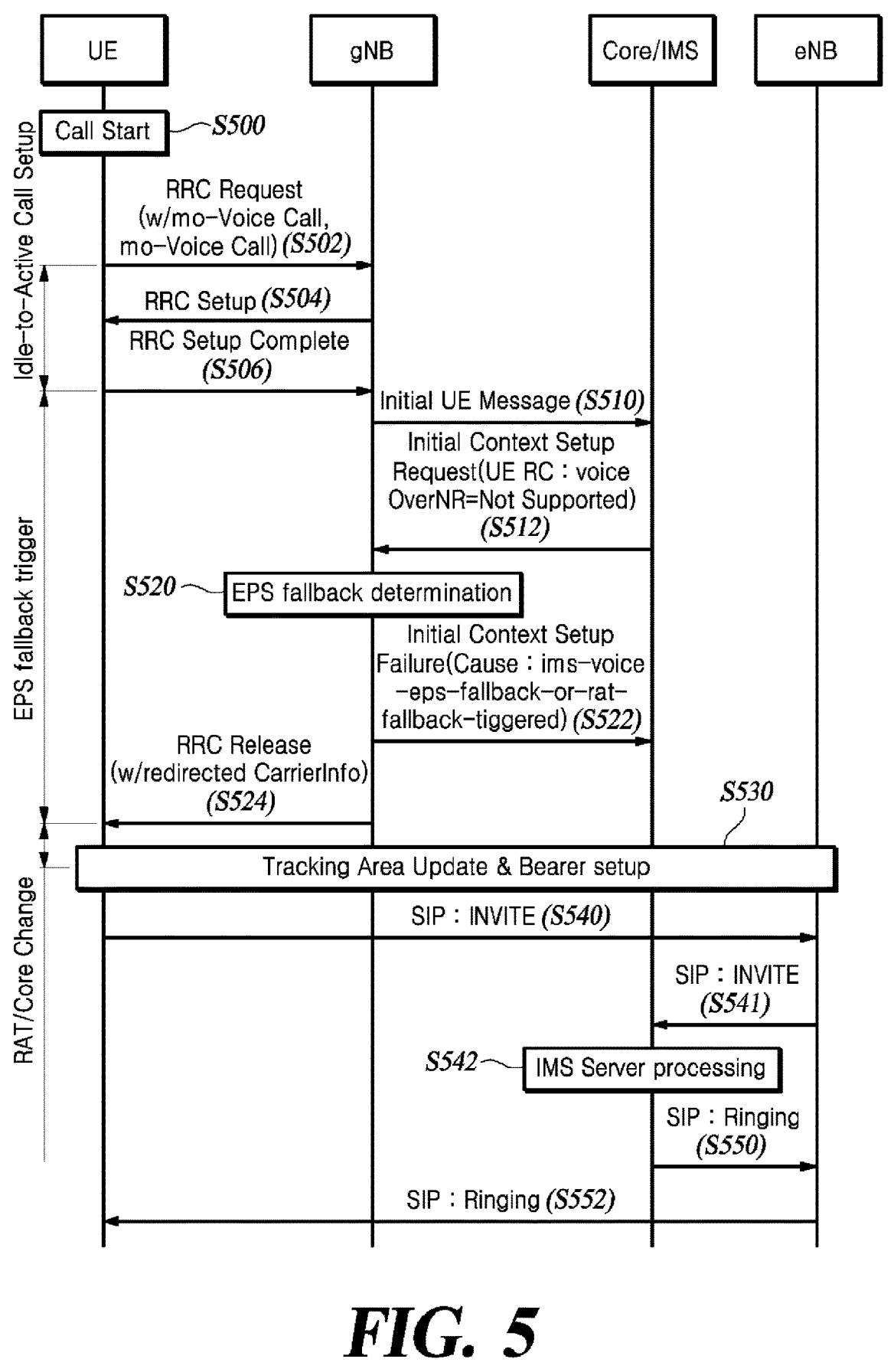
Figure 6:
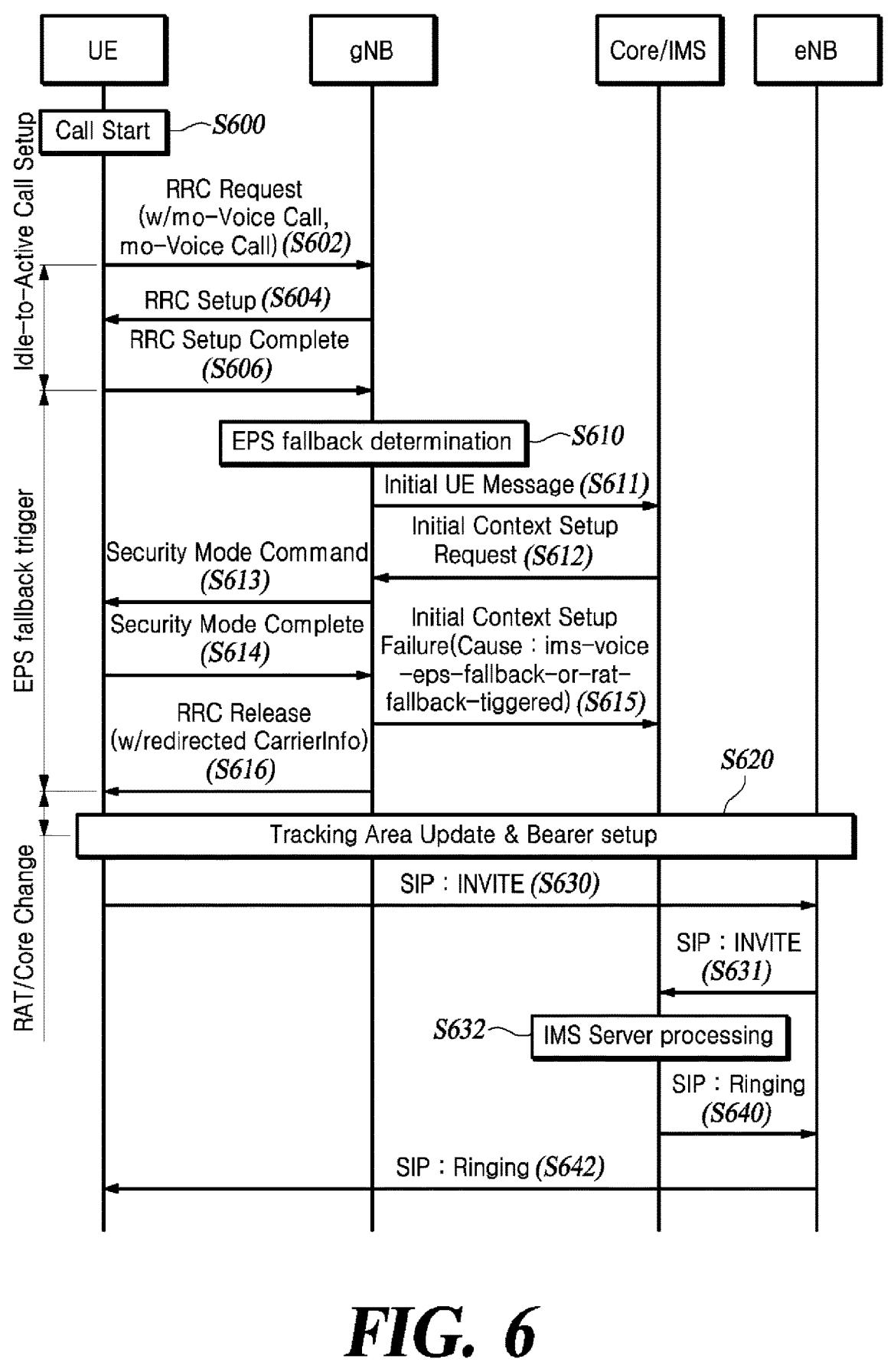
Figure 7:
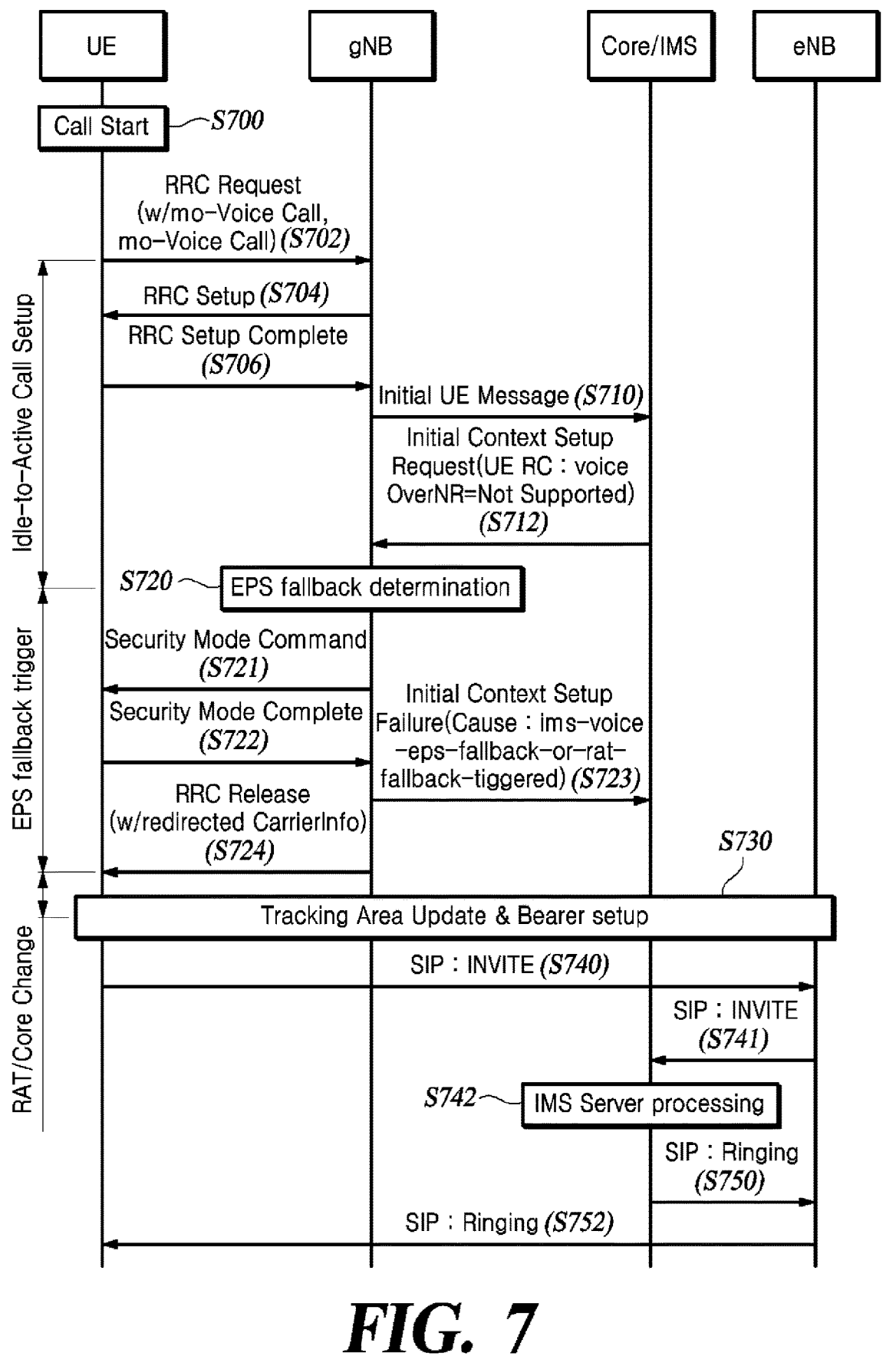

Hereinafter, a process of providing a call service to the user equipment in the idle state according to various embodiments of the present disclosure will be described with reference to FIGS. 4 to 7. FIGS. 4 and 6 illustrate examples of a case in which the base station does not support VoNR, and FIGS. 5 and 7 illustrate examples of a case in which the base station supports VoNR. Meanwhile, detailed description of the same processes as those in FIG. 2 is omitted when FIGS. 4 to 7 are described.

FIG. 4 is a flowchart illustrating a call setup process using EPS fallback according to a first embodiment of the present disclosure.

When the user equipment in the RRC idle state originates a call, the user equipment transmits the RRC connection request message to the 5G base station (S400). In this case, the user equipment sets the RRC establishment cause field in the RRC connection request message to 'mo-VoiceCall' when the user equipment requests an RRC connection for a voice call, sets the RRC establishment cause field in the RRC connection request message to 'mo-VideoCall' when the user equipment requests an RRC connection for a video call, and transmits the RRC connection request message to the 5G base station.

The 5G base station determines whether or not the EPS fallback is to be triggered based on the RRC establishment cause field in the RRC connection request message (S410). Here, since the 5G base station does not support VoNR, the 5G base station may check the RRC establishment cause field to detect that the user equipment has requested a voice and/or video call service, and then, immediately determine whether or not the EPS fallback is to be triggered without an additional confirmation process (for example, checking whether the user equipment supports VoNR, etc.).

FIG. 5 is a flowchart illustrating a call setup process using EPS fallback according to a second embodiment of the present disclosure.

When the user equipment in the RRC idle state originates a call, the user equipment transmits the RRC connection request message to the 5G base station (S500). In this case, the user equipment sets the RRC establishment cause field in the RRC connection request message to 'mo-VoiceCall' when the user equipment requests an RRC connection for a voice call, sets the RRC establishment cause field in the RRC connection request message to 'mo-VideoCall' when the user equipment requests an RRC connection for a video call, and transmits the RRC connection request message to the 5G base station.

The 5G base station configures the initial UE message based on the information included in the RRC connection setup complete message and transmits the initial UE message to the core network (S510). The core network transmits the initial context setup request message to the 5G base station (S512). In this case, the core network may provide the base station with whether or not the user equipment supports VoNR. For example, FIG. 5 illustrates an example of a case in which the user equipment does not support VoNR, and the core network sets the item 'voiceOverNR' of the UE radio capability information in the initial context setup request message to 'Not Supported' and transmits the initial context setup request message to the 5G base station.

The 5G base station determines whether or not the EPS fallback is to be triggered based on the RRC establishment cause field in the RRC connection request message and the UE radio capability information in the initial context setup request message (S520).

The 5G base station transmits an initial context setup failure message to the core network (or IMS) (S522). In this case, the 5G base station sets a field 'cause' in the initial context setup failure message to 'ims-voice-eps-fallback-or-rat-fallback-triggered' to inform the core network (or IMS) of a failure due to the EPS fallback.

As illustrated in FIGS. 6 and 7, according to other embodiments of the present disclosure, the 5G base station can perform a security setup procedure with the user equipment prior to transmitting the RRC release message including the LTE frequency information for fallback to the user equipment.

FIG. 6 is a flowchart illustrating a call setup process using EPS fallback according to a third embodiment of the present disclosure.

Detailed description of the same processes as those in FIG. 4 is omitted when FIG. 6 is described.

The 5G base station determines whether or not the EPS fallback is to be triggered based on the RRC establishment cause field in the RRC connection request message (S610), and then, transmits the initial UE message to the core network (S611). The core network transmits the initial context setup request message to the 5G base station (S612).

The 5G base station transmits the security mode command message to the user equipment (S613), and the user equipment transmits the security mode complete message to the 5G base station in response to the security mode command (S614).

The 5G base station transmits the initial context setup failure message to the core network (or IMS) (S615). In this case, the 5G base station sets the field 'cause' in the initial context setup failure message to 'ims-voice-eps-fallback-or-rat-fallback-triggered' to inform the core network (or IMS) of the failure due to EPS fallback.

After such initial context setup and security setup procedures are completed, the 5G base station transmits an RRC release message including the LTE frequency information for fallback to the user equipment (S616).

FIG. 7 is a flowchart illustrating a call setup process using EPS fallback according to a fourth embodiment of the present disclosure.

Detailed description of the same processes as those of FIG. 5 are omitted when FIG. 7 is described.

The 5G base station determines whether or not the EPS fallback is to be triggered based on the RRC establishment cause field in the RRC connection request message and the UE radio capability information in the initial context setup request message (S720), and then, transmits the security mode command message to the user equipment (S721). In response to the security mode command, the user equipment transmits the security mode complete message to the 5G base station (S722).

After such a security setting procedure is completed, the 5G base station transmits the initial context setup failure message to the core network (or IMS) (S723) and transmits the RRC release message including the LTE frequency information for fallback to the user equipment (S724).

As described above, according to various embodiments of the present disclosure, it is possible to shorten the initial setup time, as compared with an EPS fallback trigger scheme according to the related art, because the base station can directly determine whether or not the EPS fallback is to be triggered based on, for example, the RRC establishment cause and/or the UE radio capability information.

Meanwhile, as illustrated in FIGS. 5 and 7, since a process of checking whether or not the user equipment supports VoNR is required when the base station supports VoNR, the initial setup time is slightly increased as compared with a fallback trigger scheme according to the embodiment illustrated in FIGS. 4 and 6, but a service can be selectively performed using the VoNR scheme for the user equipment that supports VoNR, and there is an advantage that it is possible to still shorten the initial setup time as compared with the EPS fallback trigger scheme according to the related art.

Figure 8:
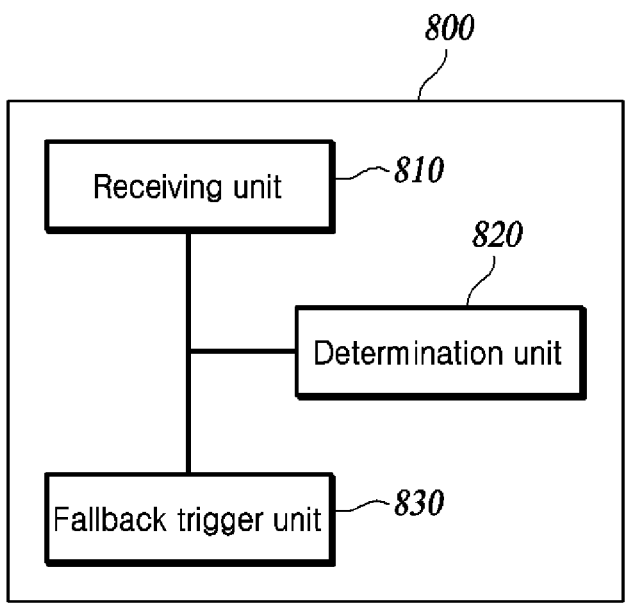
FIG. 8 is a configuration block diagram of a base station according to an embodiment of the present disclosure.

FIG. 8 is a configuration block diagram of a base station according to an embodiment of the present disclosure.

Referring to FIG. 8, a base station 800 according to an embodiment of the present disclosure includes all or some of a receiving unit 810, a determination unit 820, and a fallback trigger unit 830. All blocks illustrated in FIG. 8 are not essential components, and some of the blocks included in the base station 800 may be added, changed, or deleted in another embodiment. That is, components of the base station 800 for detecting the call service request of the user equipment and triggering the EPS fallback according to the present embodiment are exemplarily illustrated in FIG. 8, and it should be recognized that the base station 800 may have a configuration of more or less components than the illustrated components, or different components, for implementation of other functions.

The receiving unit 810 detects the call service request of the user equipment based on a message received from the user equipment and/or the IMS server.

The receiving unit 810 according to the embodiment of the present disclosure detects the call service request of the user equipment using the RRC connection request message received from the user equipment. Specifically, the receiving unit 810 can detect the call service request of the user equipment based on whether the RRC establishment cause field in the RRC connection request message is set to a value related to the call service request of the user equipment. Here, the value related to the call service request of the user equipment may be 'mo-VoiceCall' or 'mo-VideoCall'.

The receiving unit 810 according to another embodiment of the present disclosure detects the call service request of the user equipment using the PDU session resource modify request message received from the IMS server. Specifically, the receiving unit 810 may detect the call service request of the user equipment based on whether 5QI included in the PDU session resource modify request message is set to 1.

The determination unit 820 determines whether a capability of the base station or a capability of the user equipment satisfies a preset fallback trigger condition.

The determination unit 820 according to an embodiment of the present disclosure checks whether the base station supports VoNR. To this end, a first parameter indicating whether or not the base station supports VoNR may be defined in the determination unit 820 in advance. When the base station does not support VoNR, the determination unit 820 determines that the capability of the base station satisfies the preset fallback trigger condition.

The determination unit 820 according to an embodiment of the present disclosure checks whether the base station is set to provide the call service only in the EPS fallback scheme. To this end, the second parameter indicating the call service providing scheme may be defined in the base station in advance. When the base station is set to provide the call service only in the EPS fallback scheme, the determination unit 820 determines that the capability of the base station satisfies the preset fallback trigger condition.

The determination unit 820 according to the embodiment of the present disclosure checks whether or not the user equipment supports VoNR. The determination unit 820 may check whether or not the user equipment supports VoNR by checking the UE radio capability information in the initial context setup request message received from the AMF. For example, when the item 'voiceOverNR' in the UE radio capability information is set to 'supported', the determination unit 820 may check that the user equipment supports VoNR. Meanwhile, when the UE radio capability is not included in the initial context setup request message, the determination unit 820 transmits a UE capability enquiry message instructing the user equipment to report the UE radio capability information to the user equipment. Accordingly, the base station may receive the UE radio capability information from the user equipment and check whether the item 'voiceOverNR' in the UE radio capability information has been set to 'supported'.

When the user equipment does not support VoNR, the determination unit 820 determines that the capability of the user equipment satisfies the preset fallback trigger condition.

The fallback trigger unit 830 triggers the EPS fallback when the user equipment requests a call service and/or when the capability of the base station or the capability of the user equipment satisfies the preset fallback trigger condition. The fallback trigger unit 830 sets the LTE frequency information for connection of the user equipment in the field 'redirectedCarrierInfo' in the RRC release message and transmits the RRC release message to the user equipment.

Although a case in which the respective processes are sequentially executed has been described with reference to FIGS. 1 to 7, this is merely an example of the technical idea of the embodiment of the present disclosure. In other words, since those skilled in the art to which the embodiment of the present disclosure belongs execute the processes in changed orders from orders described in FIGS. 1 to 7 or execute one or more of the respective processes in parallel without departing from the essential characteristics of the embodiment of the present disclosure so that various changes or modifications can be applied, FIGS. 1 to 7 are not limited to a time-series order.

Various implementation examples of the systems and schemes described herein may be realized by a digital electronic circuit, an integrated circuit, a field programmable gate arrays (FPGA), an application specific integrated circuits (ASIC), computer hardware, firmware, software, and/or a combination thereof. The various implementation examples may include implementations by one or more computer programs executable on a programmable system. The programmable system includes at least one programmable processor (which may be a special purpose processor or may be a general purpose processor) coupled to receive data and instructions from and transmit data and instructions to a storage system, at least one input device, and at least one output device. The computer programs (also known as programs, software, software applications, or code) contain instructions for the programmable processor, and are stored on a "computer readable recording medium".

The computer-readable recording medium includes all types of recording devices in which data that can be read by a computer system is stored. The computer-readable recording medium may be a non-volatile or non-transitory medium such as a ROM, a CD-ROM, a magnetic tape, a floppy disk, a memory card, a hard disk, a magneto-optical disk, and a storage device, and may further include a transitory medium such as a data transmission medium. Further, the computer-readable recording medium may be distributed to computer systems connected through a network, and computer-readable codes may be stored and executed in a distributed manner.

Various implementation examples of the systems and schemes described herein may be implemented by a programmable computer. Here, the computer includes a programmable processor, a data storage system (including a volatile memory, a non-volatile memory, other types of storage systems, or a combination thereof), and at least one communication interface. For example, the programmable computer may be one of a server, a network device, a set top box, an embedded device, a computer expansion module, a personal computer, a laptop computer, a personal data assistant (PDA), a cloud computing system, and a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

The invention claimed is:

1. A base station of a first wireless communication system for triggering fallback from the first wireless communication system to a second wireless communication system, the base station comprising:

a non-transitory memory to store instructions; and a processor to implement one or more of the instructions to:

receive an RRC connection request message from user equipment;

check whether or not the user equipment requests a call service using the RRC connection request message;

determine whether to trigger the fallback to the second wireless communication system based on whether the user equipment requests the call service;

perform a security setting procedure for the user equipment after a determination of whether to trigger the fallback; and in response to a determination to trigger the fallback:

transmit, after the security setting procedure, an initial context setup failure message to a core network; and transmit, after transmitting the initial context setup failure message, a message to the user equipment to trigger the fallback to the second wireless communication system.

2. The base station of claim 1, wherein the processor, when checking whether or not the user equipment requests the call service, is further to check whether an RRC establishment cause field in the RRC connection request message is set to a value related to a call service request of the user equipment.

3. The base station of claim 2, wherein the value related to the call service request of the user equipment is mo-VoiceCall or mo-VideoCall.

4. The base station of claim 1, wherein the processor is further to: determine whether a capability of the base station or a capability of the user equipment satisfies a preset condition, and wherein the processor, when determining whether to trigger the fallback, is further to determine to trigger the fallback to the second wireless communication system when the user equipment requests the call service and the capability of the base station or the capability of the user equipment requesting the call service satisfies the preset condition.

5. The base station of claim 4, wherein the processor, when determining whether the capability of the base station or the capability of the user equipment satisfies the preset condition, is further to check whether the user equipment supports the call service using the first wireless communication system based on an initial context setup request message received from a core network of the first wireless communication system.

6. The base station of claim 5, wherein the processor is further to request the user equipment to provide information related to whether or not the user equipment supports the call service using the first wireless communication system when the information related to whether or not the user equipment supports the call service using the first wireless communication system is not included in the initial context setup request message.

7. The base station of claim 1, wherein the processor, when transmitting the message to the user equipment, is further to transmit in RRC release message including information on the second wireless communication system to the user equipment.

8. A method of triggering fallback to a second wireless communication system by a base station of a first wireless communication system, the method comprising:

receiving an RRC connection request message from a user equipment;

checking whether or not the user equipment requests a call service using the RRC connection request message;

determining whether to trigger the fallback to the second wireless communication system based on whether the user equipment requests the call service;

performing a security setting procedure for the user equipment after the determining whether to trigger the fallback; and in response to a determination to trigger the fallback:

transmitting, after the security setting procedure, an initial context setup failure message to a core network; and transmitting, after transmitting the initial context setup failure message, a message to the user equipment to trigger the fallback to the second wireless communication system.

9. The method of claim 8, wherein the checking includes checking whether an RRC establishment cause field in the RRC connection request message is set to a value related to a call service request of the user equipment.

10. The method of claim 9, wherein the value related to the call service request of the user equipment is mo-VoiceCall or mo-VideoCall.

11. The method of claim 8, further comprising:

determining whether a capability of the base station or a capability of the user equipment satisfies a preset condition, wherein the determining whether to trigger the fallback includes determining to trigger the fallback to the second wireless communication system when the user equipment requests the call service and the capability of the base station or the capability of the user equipment requesting the call service satisfies the preset condition.

12. The method of claim 11, wherein determining whether the capability of the base station or the capability of the user equipment satisfies the preset condition includes:

checking whether the user equipment supports the call service using the first wireless communication system based on an initial context setup request message received from a core network of the first wireless communication system.

13. The method of claim 12, further comprising:

requesting the user equipment to provide information related to whether or not the user equipment supports the call service using the first wireless communication system when the information related to whether or not the user equipment supports the call service using the first wireless communication system is not included in the initial context setup request message.

14. The method of claim 8, wherein transmitting the message to the user equipment includes transmitting an RRC release message including information on the second wireless communication system to the user equipment.

* * * * *